W. F. MOORE.
PLOW.
APPLICATION FILED JULY 22, 1916.
1,218,883.
Patented Mar. 13, 1917.
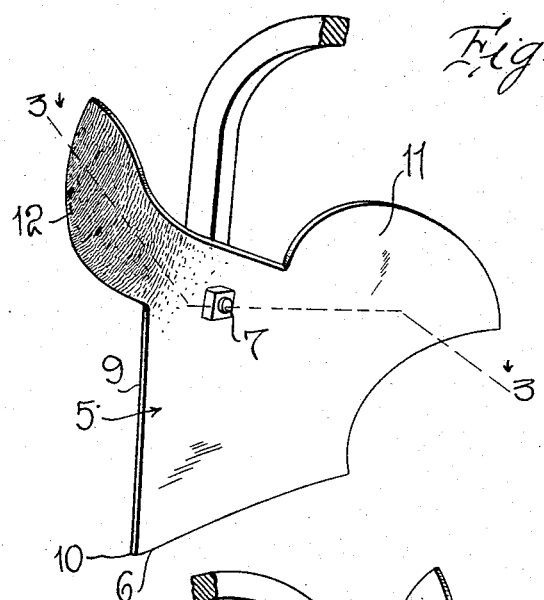
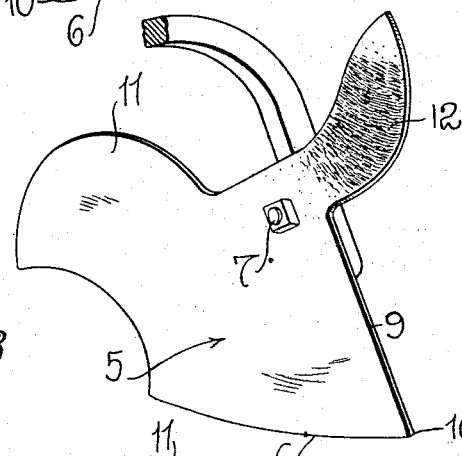
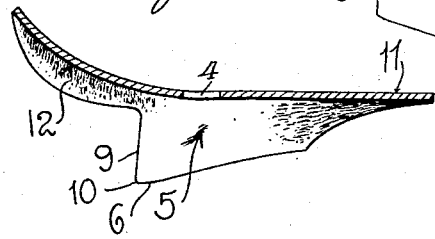
Inventor
W. F. MOORE
By Watson E. Coleman
Attorney

UNITED STATES PATENT OFFICE.

WILLIAM F. MOORE, OF VOTAW, TEXAS.

PLOW.

1,218,883.  Specification of Letters Patent.  Patented Mar. 13, 1917.

Application filed July 22, 1916. Serial No. 110,732.

*To all whom it may concern:*

Be it known that I, WILLIAM F. MOORE, a citizen of the United States, residing at Votaw, in the county of Hardin and State of Texas, have invented certain new and useful Improvements in Plows, of which the following is a specification, reference being had to the accompanying drawings.

This invention relates to plows and has for its primary object to provide a plow of that type commonly known as a wing plow wherein the blade of the plow is provided on its upper end with an angularly projecting wing for the purpose of preventing the earth being thrown over upon immature plants in cultivating close to the plant row.

It is another object of the invention to provide a plow of the above character which may be used for either deep or shallow plowing and can also be employed for breaking new land.

It is a further general object of my invention to devise an improved form of wing plow which may be produced in the form of a single casting and may, therefore, be cheaply manufactured and also rendered highly efficient and serviceable in practical use.

With the above and other objects in view, my invention consists in the novel features of construction, combination and arrangement of parts to be hereinafter more fully described, claimed and illustrated in the accompanying drawing, in which, Figure 1 is a perspective view of my improved plow;

Fig. 2 is a similar view showing the reverse position of the plow for the purpose of cultivating the ground close to the plant row; and Fig. 3 is a section taken on the line 3—3 of Fig. 1.

Referring in detail to the drawing, 5 designates the blade or body of the plow which is slightly curved longitudinally and is provided with an obliquely disposed, ground penetrating lower edge 6. The upper end of this blade is provided with a rectangular opening 4 to receive the securing bolt 7, whereby the blade may be rigidly fastened to the lower end of a plow standard or stock, and the major portion of the plow blade projects laterally to one side of said standard. The longitudinal edge 9 of the blade, contiguous to the standard, is slightly inclined with respect to a central longitudinal line through the point 10 of the plow blade and the bolt receiving opening therein. Upon the upper end of the blade 5, a wide, upwardly and laterally projecting mold board 11 is formed. This mold board is flat and disposed in substantially the same plane as the body of the blade.

At the upper end of the longitudinally inclined edge 9 of the plow blade, a relatively narrow, laterally and upwardly extending wing 12 is formed. This wing 12 is substantially concavo-convex in cross-section and curved upwardly and outwardly relative to a face of the blade 5, and is widest at its central or intermediate portion and gradually tapers to its extremity.

In the use of my improved plow as shown in Fig. 1, the blade may be secured upon the plow stock or standard with its convex face opposed to the standard and the wing 11 extending from the right hand side of the blade while the wing 12 projects from the left hand side thereof. The blade is used in this position when plowing a furrow along a central line between the plant rows, or in breaking up new land. For the purpose of cultivating young plants, the plow blade is used in the position shown in Fig. 2 where the concave face of the blade is opposed to the ground surface and the convex face thereof is uppermost. The mold board 11 now projects from the left hand side of the blade and over the young plants. The plow blade may be operated close to the plants, and the mold board 11 will prevent the earth being thrown over upon the immature plants and killing the same. The curved wing 12 acts to turn the earth inwardly along the edge of the furrow and prevent the same from being thrown over upon the plants of the adjacent row.

From the foregoing description, taken in connection with the accompanying drawing, the construction, manner of use and several advantages of my improved plow will be clearly and fully understood. It will be seen that I have devised a very simple and serviceable wing plow which may be cast in a single operation, thus conducing to a low cost of manufacture. I have found the plow to be highly serviceable and convenient for the purposes in view, and to eliminate the necessity of using a number of different agricultural implements for the proper cultivation of the plants.

It will, of course, be understood that the plow may be made in any desired size and the structural features thereof also considerably varied. I, therefore, reserve the privilege of resorting to all such legitimate changes as may be fairly embodied within the spirit and scope of the invention as claimed.

Having thus fully described my invention, what I desire to claim and secure by Letters Patent is:—

1. As a new article of manufacture, a plow consisting of a blade having one vertical edge substantially straight and provided at its opposite vertical portion with a mold board, and a wing extending laterally from the upper portion of the vertical edge of the blade, said wing being curved upwardly and outwardly relative to a face of the blade.

2. As a new article of manufacture, a plow consisting of a blade having one vertical edge substantially straight and provided at its opposite vertical portion with a mold board, and a wing substantially concavo-convex in cross section extending laterally from the upper portion of the vertical edge of the blade, said wing being curved upwardly and outwardly relative to a face of the blade.

In testimony whereof I hereunto affix my signature in the presence of two witnesses.

WILLIAM F. MOORE.

Witnesses:
 JAMES W. SMITH,
 J. T. DEWIS.

Copies of this patent may be obtained for five cents each, by addressing the "Commissioner of Patents, Washington, D. C."